United States Patent [19]

Patterson et al.

[11] 3,797,852
[45] Mar. 19, 1974

[54] SUSPENSION SYSTEM
[75] Inventors: Norman P. Patterson, St. Clair Shores; David J. Perkins, Royal Oak, both of Mich.
[73] Assignee: Chrysler Corporation, Highland Park, Mich.
[22] Filed: Aug. 7, 1972
[21] Appl. No.: 278,334

[52] U.S. Cl. ........... 280/124 A, 267/61 R, 267/20 A
[51] Int. Cl. .............................................. B60g 3/04
[58] Field of Search ........... 280/124 R, 124 A, 96.1, 280/96.2 R; 267/60, 61 R, 166, 167, 20 A

[56] References Cited
UNITED STATES PATENTS

| | | | |
|---|---|---|---|
| 3,079,137 | 2/1963 | Schilberg | 280/96.2 R |
| 3,717,354 | 2/1973 | Ritter | 280/124 A |
| 2,797,930 | 7/1957 | Booth | 280/96.2 R |
| 3,181,882 | 5/1965 | Rosky et al. | 267/20 A |
| 2,779,603 | 1/1957 | McRae | 267/20 A |
| 2,916,282 | 12/1959 | Muller et al. | 267/20 A |
| 3,075,786 | 1/1963 | Freers et al. | 267/20 A |

*Primary Examiner*—David Schonberg
*Assistant Examiner*—John A. Carroll

[57] ABSTRACT

Suspension system for a vehicle, the suspension system including a shock absorber surrounded by a coil spring. The lower ends of the shock absorber and coil spring engage a lower control arm. The lower control arm is formed with a seating portion for receiving the spring and shock absorber.

9 Claims, 5 Drawing Figures

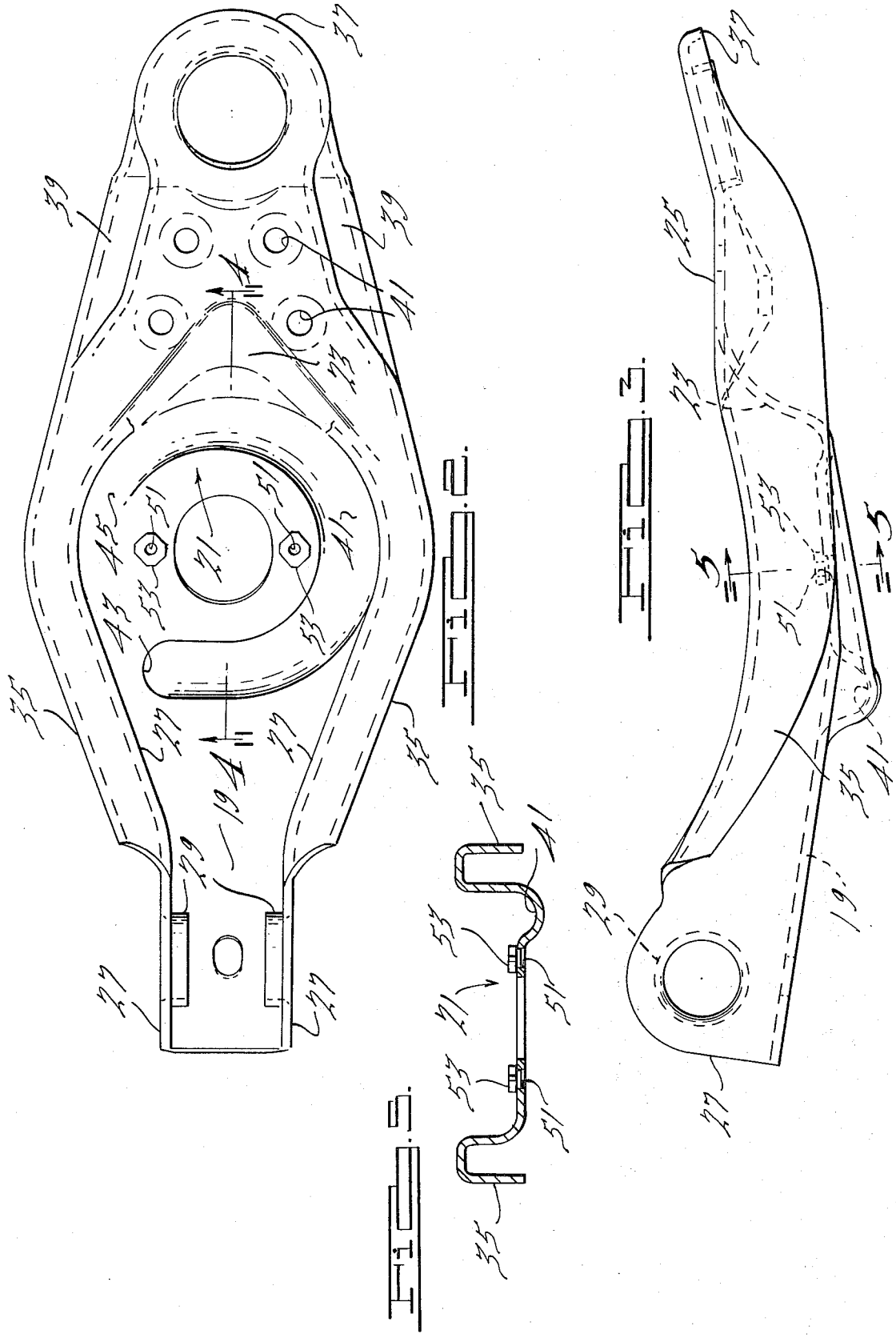

3,797,852

SUSPENSION SYSTEM

BACKGROUND OF THE INVENTION

This invention relates to vehicle suspension systems, and more particularly to the lower control arm of the front suspension means for suspending the front wheels of a vehicle, such as a truck, for example.

There are many types of suspension systems for the front wheels of a vehicle. However, one of the most common and well-known types includes upper and lower control arms which are pivotally connected to the vehicle body and frame at one end and are connected by pivotal ball joints at the other end to a steering knuckle the spindle of which supports the wheel. A shock absorber assembly extends between the frame and the lower control arm and a coil spring surrounds the shock absorber assembly, also extending between the frame and the lower control arm. The present invention is particularly directed to lower control arm which is adapted and shaped to facilitate connection and seating of the shock absorber and spring.

BRIEF SUMMARY OF THE INVENTION

Briefly, this invention comprises a suspension system including a lower control arm having an inner lower base portion and an outer upper base portion, the lower portion having a seating portion for seating a spring.

One of the primary objects of this invention is to provide an improved vehicle suspension.

Another object of this invention is to provide a suspension of the type described wherein the lower control arm is resiliently connected to the vehicle superstructure.

A further object of this invention is to provide a suspension of the class described wherein the lower control arm is particularly shaped for strength and adapted for seating the resilient means connecting such arm to the vehicle superstructure.

Still another object of this invention is to provide a suspension system including a lower control arm which is effective in operation.

Other objects and advantages of this invention will be made apparent as the description progresses.

BRIEF DESCRIPTION OF THE DRAWINGS

In the accompanying drawings, in which one of various possible embodiments is shown.

FIG. 2 is an enlarged plan view of a lower control arm of this invention;

FIG. 3 is a side elevation of FIG. 2;

FIG. 5 is a section taken along lines 5—5 of FIG. 3.

Like parts are shown by corresponding reference characters throughout the several views of the drawings.

DESCRIPTION OF THE PREFERRED EMBODIMENT

Figure 1:
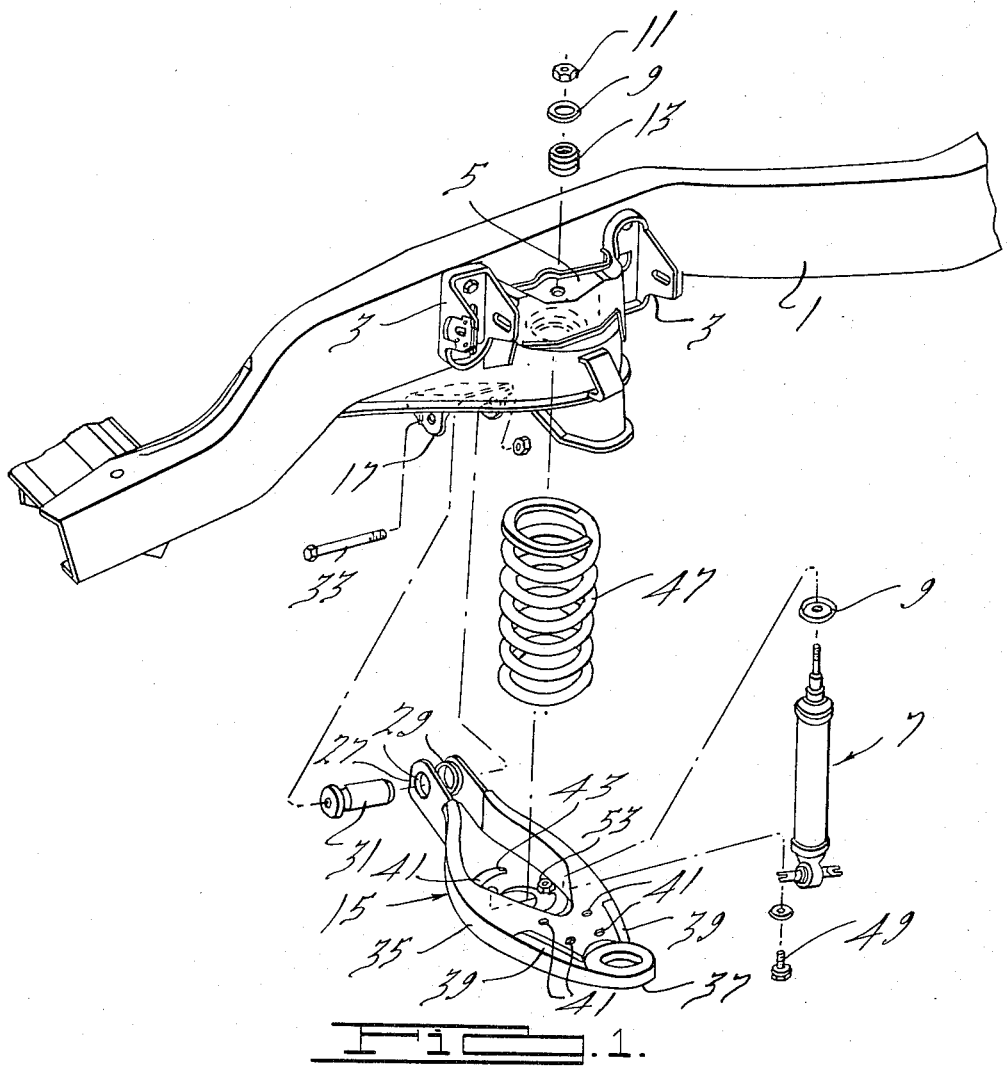
FIG. 1 is an expanded perspective view of the suspension apparatus of this invention.
Figure 4:
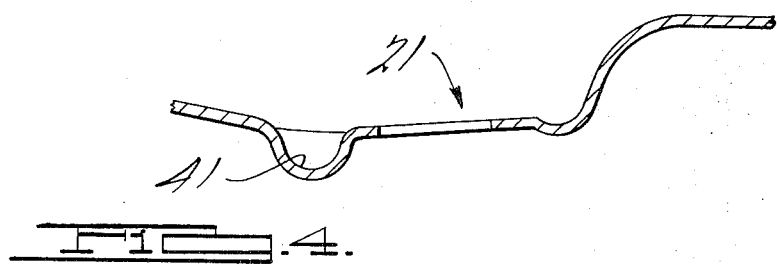
FIG. 4 is a section taken along lines 4—4 of FIG. 2.

Referring now to the drawings, a suspension system including a lower control arm is generally shown in FIG. 1. As shown, it includes a frame member 1 having a bracket assembly 3 securing an upper mounting structure 5 to the frame member. The upper end of a shock absorber assembly 7 is adapted to be secured by retainers 9, nut 11 and bushing 13 to the mounting structure 5.

A lower control arm 15 is connected at one end to a bracket 17. More specifically, the lower control arm 15 is a one-piece arm formed with an inner lower base portion 19 having a spring seating portion 21 at one end thereof. The base portion 19 adjacent seating portion 21 curves upwardly and outwardly as shown at 23 into an outer upper base portion 25.

At its inner end control arm 15 has two rigidifying flanges or side walls 27 extending upwardly from the inner lower base portion 21 and having annular flanges or lips 29 extending toward one another. A bushing assembly 31 is adapted to extend through the openings within annular lips 29 and a bolt 33 is adapted to extend through the bushing for securing the inner end of the lower control arm pivotally to the bracket 17.

The side walls 27 extend outwardly from the inner end of the control arm around the spring seating portion 19 where the walls join together at the curved portion 23. The upper end of the side walls 27 from a point outwardly of the bushing 31 to the curved portion 23 are folded from their upper edge on a radius back downward to form rigidifying side walls 35.

The side walls 35 extend outwardly to the upper base portion 25 and merge together in a rigidifying lip 37 at the outer end of the arm. An annular flange or lip 39 is formed in the outer end of the arm for receiving the ball joint coupling (not shown) used to connect the lower control arm to a steering knuckle.

Rigidifying depressions 39 are formed along the juncture of upper base portion 25 and side walls 35. Base portion 25 also has a plurality of openings 41 therein for receiving bolts (not shown) used in connecting the forward end of a strut (also not shown) to the control arm.

The spring seating portion 19 is formed with a generally circular shaped recess or groove 41 which gradually decreases in depth from one end 43 to the other end 45 at which end the recess merges with the surface of the seat portion surface 21. This recess 41 is adapted to receive and seat the lower end of a coil spring 47 and to locate the spring so that it surrounds shock absorber assembly 7. The lower end of shock absorber assembly 7 is adapted to be secured to the arm 15 by bolts 49 which extend through openings 51 in the spring seating portion 21 and are threaded into nuts 53 welded to the portions 21. The bolts 49 clamp bifurcated wing members 55 on the lower end of the shock absorber to the lower side of the seating portion 21.

The lower control arm is adapted to be connected to the vehicle in the manner illustrated in FIG. 1 to provide a strong connection between the frame and spindle.

In view of the foregoing it will be seen that the several objects and other advantages are attained.

Although only one embodiment of the invention has been disclosed and described, it is apparent that other embodiments and modifications of the invention are possible.

We claim:

1. In a suspension system for a vehicle having a frame means, a lower control arm, means for connecting one end of said lower control arm to said frame means, a spring extending between said lower control arm and said frame means, and shock absorbing means extending between said lower control arm and said frame means; said lower control arm including an inner lower base portion extending outwardly from the inner end of said arm, said inner lower base portion having a spring seating portion at the outer end thereof between the inner portion of said lower base portion and the outer upper base portion, said spring seating portion having means thereon for seating the spring and attaching the lower end of the shock absorbing means thereto, means for rigidifying said lower control arm, said rigidifying means comprising a first set of rigidifying walls extending upwardly from said inner lower base portion and a second set of rigidifying walls connected to said first set of rigidifying walls and to said outer upper base portion, and elongated rigidifying depressions in said lower control arm at the juncture of said second set of rigidifying walls and said outer upper base portion.

2. In a suspension system as set forth in claim 1, further including annular lips extending toward one another from said first set of walls adjacent the inner end of said control arm.

3. In a suspension system as set forth in claim 1 wherein said lower control arm further includes a lip extending downwardly from said outer upper base portion around the outer edge thereof.

4. In a suspension system as set forth in claim 1 wherein said means for seating said spring includes a generally circular shaped recess formed in said spring seating portion, said recess gradually decreasing in depth from one end thereof to the other end thereof.

5. In a suspension system as set forth in claim 4 further including annular lips extending toward one another from said first set of walls adjacent the inner end of said control arm.

6. In a suspension system as set forth in claim 5 wherein said lower control arm further includes a lip extending downwardly from said outer upper base portion around the outer edge thereof.

7. In a suspension system as set forth in claim 2 wherein said outer upper base portion has an annular lip surrounding an opening therein and extending downwardly therefrom.

8. In a suspension system as set forth in claim 7 wherein said lower control arm further includes a lip extending downwardly from said outer upper base portion around the outer edge thereof.

9. In a suspension system as set forth in claim 8 wherein said means for seating said spring includes a generally circular shaped recess formed in said spring seating portion, said recess gradually decreasing in depth from one end thereof to the other end thereof.

* * * * *